United States Patent [19]

Garon et al.

[11] 4,119,951
[45] Oct. 10, 1978

[54] MICROWAVE INTRUSION SENSING UNITS AND ANTENNA THEREFOR

[76] Inventors: Gilles Garon, 408 Vauquelin, Beloeil; Andre Henault, 2060 Charles-Gill, Montreal, both of Canada

[21] Appl. No.: 769,081

[22] Filed: Feb. 16, 1977

[51] Int. Cl.² ............................................. G08B 13/24
[52] U.S. Cl. .................... 340/552; 343/786
[58] Field of Search .............. 340/258 A, 258 B; 343/786, 783, 772

[56] References Cited

U.S. PATENT DOCUMENTS

| | | | |
|---|---|---|---|
| 3,553,702 | 1/1971 | Spanos | 343/786 |
| 3,680,074 | 7/1972 | Lieser | 340/258 A |
| 3,754,254 | 8/1973 | Jinman | 340/258 A |
| 3,886,549 | 5/1975 | Cheal et al. | 340/258 A |

*Primary Examiner*—Glen R. Swann, III
*Attorney, Agent, or Firm*—Wolder, Gross & Yavner

[57] ABSTRACT

An improved sensing unit for installation in a room to be monitored by a microwave intrusion detection system. The sensing unit comprises an omnidirectional microwave antenna made of a rectangular waveguide having a shaped aperture defined by cutting the free end of the waveguide at an angle from each short side wall. A scattering blade is positioned centrally between the pointed ends of the wide side walls thus formed.

The antenna is coupled to a transceiver whose output signal is applied to a sensitivity control serially connected to a filtering amplifier. The amplified output signal is fed to a level detector whose output is applied to a triggering signal generator through a delay circuit which inhibits signals of insufficient duration.

9 Claims, 5 Drawing Figures

MICROWAVE INTRUSION SENSING UNITS AND ANTENNA THEREFOR

BACKGROUND OF THE INVENTION

This invention relates to microwave antennas for intrusion alarm systems and to improvements in alarm systems of the microwave type.

It is known to monitor the presence of intruders into a room by detecting disturbances in a microwave field generated by a microwave transceiver and antenna unit. The antenna is of the horn type and consequently the microwave radiation pattern is basically directional. Thus the detecting unit is normally located in a corner of the room to be monitored and the horn aperture is directed toward the farthest corner of the room. A major disadvantage of such prior systems is that best results are obtained in rather long and narrow rooms otherwise there can be unwanted detection of circulation taking place outside of the monitored room. It is also known that horn detectors do not normally detect peripheral movements; they can only "see" displacements that have a radial component and that take place in front of the horn antenna.

SUMMARY OF THE INVENTION

An object of this invention is to provide a microwave sensing unit for use in an intrusion alarm system, whose radiation pattern better conforms to rectangular rooms, and which can detect displacements in all directions over the floor of the monitored room.

Another object of this invention is to provide an improved microwave intrusion alarm system.

These and other objects can be obtained with an intrusion alarm system whose sensing unit has a low power microwave transceiver with an omnidirectional antenna that comprises a rectangular waveguide having a shaped aperture at its free end with a scattering blade extending centrally across the shaped aperture of the waveguide perpendicularly to the wide side walls of said waveguide terminating short of the wide side walls. In a preferred embodiment, the free end of the waveguide is cut at an angle of about 45° from each short side wall toward the center of the wide side walls and the length of the scattering blade is about one quarter of a wavelength.

The invention also provides for use in a microwave intrusion alarm system a sensing unit comprising an omnidirectional microwave antenna as described above, a transceiver to which the antenna is coupled, a sensitivity control for adjusting the level of the output signal of the transceiver, a filtering amplifier serially connected between the sensitivity control and a level detector, the output of the level detector being applied to the input of a triggering circuit through a local time delay circuit for preventing false triggering signals.

In a preferred embodiment, the sensing unit comprises a local warning signal whenever local sounding device to be used for the adjustment and testing procedure.

In an alternative embodiment, a small electrically conductive blade covers one side of the shaped aperture of the antenna as this increases the opposite side lobe of the detection pattern and practically eliminates coverage on the side of the shaped aperture where the blade is installed.

BRIEF DESCRIPTION OF THE DRAWINGS

In the accompanying drawings which illustrate an examplary embodiment of this invention.

DESCRIPTION OF THE PREFERRED EMBODIMENTS

Figure 1:
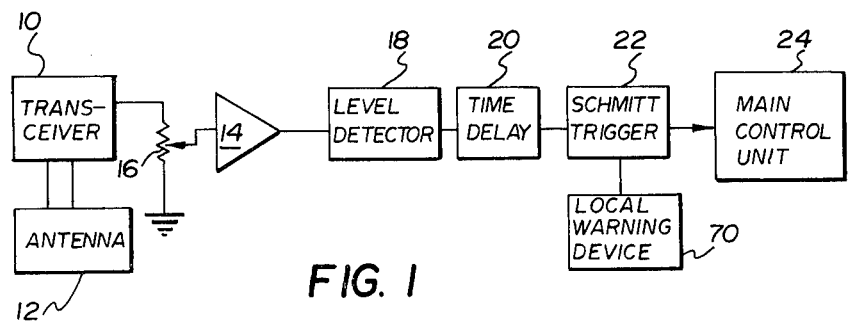
FIG. 1 is a block diagram of an intrusion alarm system.

A block diagram of the main components in an alarm system is illustrated in FIG. 1. Transceiver 10 is coupled to microwave antenna 12 and this combination generates a microwave field according to a particular pattern. The pattern is determined by the nature and construction of antenna 12. In prior designs the antenna 12 is normally of the horn type and its pattern is basically directional. It is therefor installed in one corner of the room to be monitored, facing the farthest corner.

Figure 4:
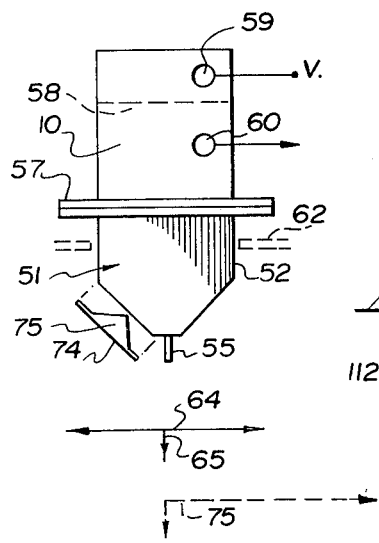
FIG. 4 is a front elevational view of the antenna shown in FIGS. 2 and 3.

The transceiver is the combination of a gunn diode oscillator, a shottky barrier receiver diode 60, separated from the gunn diode 59 by an iris plate 58, and a common housing as shown in FIG. 4. The gunn diode generates microwave oscillations which are transmitted by antenna 12. The shottky diode which has a specific resonance frequency produces an output signal representative of the amplitude and frequency of the disturbance taking place within the reach of antenna 12.

The output signal from transceiver 10 is applied to filtering amplifier 14 through sensitivity control potentiometer 16. Amplifier 14 amplifies the components of the output signal which are comprised within predetermined frequency limits, for example between 5 and 200 Hz, and applies the amplified signal to level detector 18 whose function is to prevent detection of weak signals. Local time delay circuit 20 will block all incoming signals whose durations are less than a predetermined time constant, for example 1 second, in order to eliminate erroneous noise signals. A Schmitt trigger 22 generates a triggering signal of sufficient intensity to operate the warning circuit of the alarm system whenever transceiver 10 produces a sufficiently long output signal whose frequency and amplitude meet the constraints imposed by filtering amplifier 14 and by level detector 18.

Figure 5:
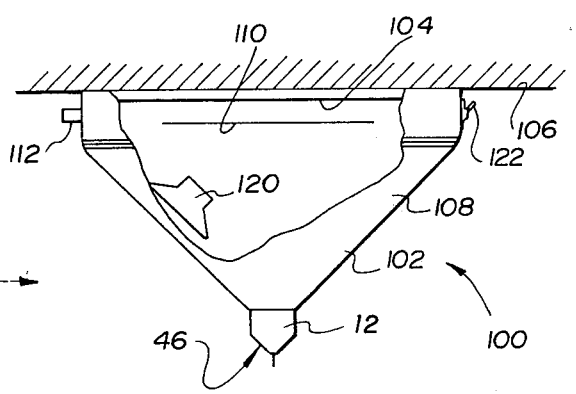
FIG. 5 is a front view of a sensing unit.

The components thus far described are installed in a suitable housing 100 seen in FIG. 5 and form a local sensing unit for monitoring a room. Normally the same alarm system will cover a plurality of separate rooms in which case the number of local sensing units 100 will be equal to the number of rooms to be monitored.

The local units 100 are connected to a main control unit 24 of conventional design which comprises a power supply with or without a battery for use during household supply failures, a power relay for closing an energizing circuit to the master alarm sounding device and a key switch for switching the alarm system to the monitoring condition or to the OFF condition.

In accordance with this invention, a particular antenna design is provided which has been found to provide numerous advantages over prior horn antennas used in intrusion alarm systems. The antenna according to this invention is of the omnidirectional type and a preferred embodiment thereof is illustrated in FIGS. 2, 3 and 4.

Figure 2:
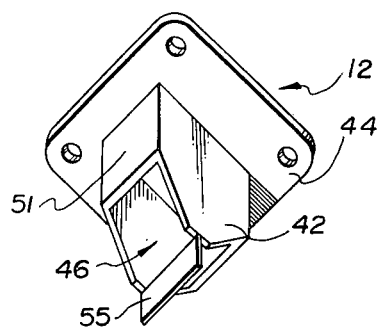
FIG. 2 is a perspective view of an omnidirectional antenna.

Antenna 12 as shown in FIG. 2 is designed for use in the X-band mode at a center frequency of 10.525 GHz. It is a low power antenna made of a length of rectangular waveguide whose internal cross-section is 0.9 × 0.4 inches, and the longest dimension of the waveguide along its longitudinal axis is about 1 inch. Wavguide 42 has a flange 44 at its inner end for connnection to flange 57 of transceiver 10 as shown in dotted lines in FIG. 3 and in full lines in FIG. 4.

The outer end of waveguide 42 defines a shaped aperture 46 and the short side walls 51 and 52 terminate short of the wide side walls 53 and 54. A scattering blade 55 extends across the shaped aperture 46 at equal distance from short side walls 51 and 52 and perpendicularly to wide side walls 53 and 54. Blade 55 is made of a good electrically conductive metal for example brass or copper and it is secured to the tip portions of the wide side walls 53 and 54 to which it is electrically connected. In practice the shaped aperture 46 of antenna 12 is obtained by cutting the waveguide at 45 degrees from each short side 51 and 52 and leaving a short flat at the tip of each wide side wall 53, 54 where rigid rectangular scattering blade 55 is eventually secured. Blade 55 extends in a plane which is equidistant from and parallel to short side walls 51 and 52. Thus shaped aperture 46 is symmetrical with respect to the plane of the scattering blade 55, and the outer edges of the short side walls 51, 52 are perpendicular to the wide side walls 53, 54. The angle of 45 degrees has been found to provide good coverage but it is not critical; a more pointed end would tend to "raise" the side lobes toward the ceiling and vice versa.

Figure 3:
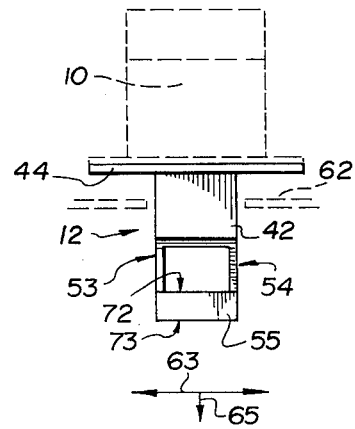
FIG. 3 is a side elevational view of the antenna shown in FIG. 2.

As shown in FIGS. 3 and 4 the flange 44 of antenna 12 is secured to the corresponding flange 57 of transceiver 10 whose iris plate is identified by dotted line 58 separating the bottom of the cavity where gunn diode 59 is located from the free end of the cavity where shottky barrier diode 60 is mounted. Regulated d.c. voltage is applied to the ungrounded electrode of gunn diode 59 as shown at V. in FIG. 4. The combination of transceiver 10 antenna 12 and circuit components 14, 16, 18, 20 and 22 is mounted into a proper housing which has an opening for the free end of antenna 12. The shaped aperture 46 should be outside of the housing. Preferably the housing should be made of non-conductive materials otherwise the length of waveguide 42 may have to be increased to prevent interference by the housing. In FIGS. 3 and 4 the edges of a plastic housing around antenna 40 are shown by dotted lines 62. Housing 102 should preferably be made of a fire retardant material particularly when the local units comprise a smoke detector in addition to serving their main purpose as an intrusion sensing unit. As seen in FIG. 5, housing 102 comprises a plate 104 secured to ceiling 106 by means of screws (not shown) and a pyramidal plastic extruded component 108 secured to plate 104 by any suitable means such as screws. Plate 104 carries a circuit board illustrated schematically by line 110, and a control knob 112 projects through housing 102 for manual adjustment of potentiometer 16.

One particular transceiver 10 found to be adequate in this application is made by Microwave Associates Inc., Burlington, Mass, U.S.A., and identified by model number MA-86501, and other low power X-band transceivers without a circulator and adapted for use in intrusion alarm applications are readily available from other sources.

Referring again to antenna 12, the length of the scattering blade 55, which is located centrally of aperture 46, is not overly critical. The function of blade 55 is to cut down the reach of the antenna immediately in front of its shaped aperture 46. This effect is important in a ceiling mounted installation because of the desirability of not detecting movements taking place on the lower floor of the building immediately below the monitored room, while maximum lateral lobes are needed for proper coverage of the monitored room. Experimentations have shown that blades measuring from about one quarter of a wavelength or slightly less to about one wavelength produce comparable results although maximum efficiency was obtained with a blade measuring 24/100 of an inch long which is just slightly less than one quarter of a wavelength for the center frequency of 10.525 GHz in free space. Efficiency is determined by the degree of standing wave which should be as low as possible. The length of scattering blade 55 is the distance between edges 72 and 73 thereof as shown in FIG. 3. Preferably the base 72 of blade 55 should be about even with the flat tips of wide side walls 53 and 54.

In a typical installation housing 102 is secured to the center region of the ceiling of the room to be monitored with the shaped aperture 46 heading downwardly. The wide sides 53 and 54 of the waveguide 42 should be parallel to the longest walls of the room.

The field pattern of antenna 12 presents wide lateral coverage in the direction of arrow 64 (FIG. 4), a somewhat narrower reach in the direction of arrow 63 (FIG. 3) and the downward reach as represented by arrow 65 is short due to the presence of scattering blade 55. In practice a microwave local unit using an antenna as shown in FIGS. 3, 4 and 5 provides a practically complete coverage in a rectangle room and will detect the presence of a human being moving in any direction inside the monitored room. In a small room of say 10 by 20 feet, the range of the local sensing unit will be reduced by proper adjustment of the sensitivity control 16 by means of knob 112. Where a large room measuring over 50 feet long, must be monitored, two or more local sensing units 100 will be mounted to the ceiling at spaced apart locations with proper adjustments of all the units sensitivity controls 16. In large halls with a high ceiling, sensing units 100 may be placed on the walls midway between the floor and the ceiling particularly in the vicinity of doors and windows, and in such cases shaped aperture 46 faces inwardly toward the center of the hall.

In accordance with this invention a small electrically conductive plate 74 can be physically and electrically connected to antenna 12 so as to block one side of aperture 46 as shown in FIG. 4. Plate 74 has two parallel wings 75 fitting over walls 53, 54 of the aperture, and one set screw (not shown) may be provided in one wing 75 for securing plate 74 in place. The effect on the pattern in the plane of the wide sides 53 and 54 is to practically eliminate the coverage of the antenna on the side of plate 74 while doubling the opposite side lobe as illustrated by the dotted arrow 75 in FIG. 4. This feature may be used to advantage where it is not practical to install the local sensing unit in the center of the ceiling, or when it is desired to more particularly cover a given wall such as a display window and a main entrance. In such cases sensing unit 100 will be mounted near the wall where maximum protection is desired.

It is important to limit the range of each local sensing unit 100 in order to prevent the detection of moving objects outside of the monitored room. It is also desirable that each local sensing unit 100 be individually tested at regular intervals. To this end it is advantageous to have a local warning device 70 as shown in FIG. 1, which will produce a sound when a distrubance occurs in the protected volume or space during testing of the alarm system.

In accordance with this invention the local warning device 70 is a low power oscillator of conventional design producing an oscillation at a suitable audible frequency such as 1 KHz and coupled to a small loudspeaker 120 shown diagramatically in FIG. 5. Test switch 122 allows the operator to connect the loudspeaker 120 and its oscillator circuit to the Schmitt trigger 22 for the testing procedure. As will be described the use of a local sounding device 70 instead of a local visual indicator as used in prior alarm systems facilitates adjustment of the sensitivity control and periodic verification of the system. When walking into the room the operator sets the local warning device 70 in operation and he can verify the system without having to continuously watch a pilot light. Whenever a movement is detected which lasts longer than the time constant of the local time delay 20 the warning device 70 produces an audio signal. When detection fails the audio signal stops. Thus testing of a local unit can be effected by walking in all directions in every area of the room and if the audio signal stops the sensitivity control 16 should be readjusted until detection resumes. The operator should then circulate around the monitored room in all places where no detection is desired, and if the audio signal is heard the sensitivity control 16 should be adjusted in the opposite direction just sufficiently to cancel detection in such areas. Obviously the main alarm sounding device should be disabled during testing.

The alarm system thus far described may also incorporate auxiliary features for added protection and control by the occupants of the monitored premises. Each local sensing device 100 could include, in addition to a microwave detector a smoke and gas sensors and/or a heat sensors which are well known in the art and which are readily available items of electrical hardware. Suitable gas sensors using sensitive semiconductors are produced by Figaro Engineering Inc., Osaka, Japan and marketed under the trade mark FIGARO TGS.

The electronic circuit for the local sensing units and for the main control unit 24 have not been described in greater details because they are well known in the art and do not form part of the invention which is primarily concerned with the design of the antenna and with overall arrangements of electrical and electronic functions in alarm systems.

We claim:

1. An antenna for use in combination with a low power microwave transceiver in an intrusion detection alarm system, said antenna comprising a rectangular waveguide adapted to be coupled at its inner end to said transceiver and having a shaped aperture at its free end with a scattering blade of electrically conductive material extending across said shaped aperture in a plane parallel to the two short side walls of said waveguide and located between and generally equidistantly from said two short side walls, said scattering blade being electrically connected to said waveguide, being supported by the two wide side walls of said waveguide and extending from the free ends of the said two wide side walls and outwardly therefrom, the short side walls of said waveguide terminating short of the free ends of said two wide side walls, said shaped aperture being symmetrical with respect to the plane of said scattering blade, wherein the outer edge of each short side wall is perpendicular to said wide side walls and wherein each wide side wall is cut at an acute angle with respect to said plane and extends from the outer edge of the respective short side wall to said scattering blade.

2. A microwave antenna as defined in claim 1 wherein the length of said scattering blade is approximately one quarter of a wavelength, and wherein said acute angle is approximately 45°.

3. An X-band microwave antenna for use in combination with a transceiver in a low power microwave intrusion detection alarm system, comprising a rectangular waveguide of about 0.9 by 0.4 of an inch inside crosssection whose free end is cut along two 45° planes perpendicular to the wide side walls of the waveguides converging toward one another and defining a line parallel to the two short side walls and equidistant thereto, said antenna also comprising a rigid rectangular scattering blade made of electrically conductive material located centrally of the aperture of said waveguide and extending between the wide side walls thereof parallel to said line, said scattering blade extending from said line outwardly therefrom for a length equal to about one quarter of a wavelength and being parallel to the short side walls of said waveguide.

4. A microwave antenna as defined in claim 3 wherein the length of said scattering blade is 24/100 of an inch.

5. In a microwave intrusion alarm system comprising at least one sensing unit, a main control unit, and a master alarm sounding device, the improvement wherein each sensing unit comprises a microwave antenna, a transceiver to which said antenna is coupled, a sensitivity control for adjusting the level of the output signal of said transceiver, a filtering amplifier connected to said sensitivity control for amplifying the output signal thereof, a level detector connected to the output of said filtering amplifier for blocking signals below a predetermined level, a local time delay circuit for blocking signals of short duration, and triggering means for generating an output signal of sufficient magnitude to trigger said master alarm sounding device when the output of said amplifier is of sufficient duration and magnitude, said microwave antenna comprising a rectangular waveguide whose free end is cut at an angle from each short side wall perpendicularly to the wide side walls for defining parallel outwardly extending pointed ends on each wide side wall, said antenna also comprising a scattering blade extending across the waveguide aperture between said pointed ends and parallel to said short side walls.

6. An improvement defined in claim 5 wherein the end of said waveguide is cut at an angle of about 45° from each short side wall.

7. An improvement defined in claim 5 wherein the length of said scattering blade is about ¼ of a wavelength.

8. An antenna for a low power microwave transceiver for use in an intrusion detection alarm system, comprising a rectangular waveguide adapted to be coupled at its inner end to said transceiver and having a shaped aperture at its free end with a scattering blade of electrically conductive material extending across said shaped aperture in a plane parallel to the two side walls of said waveguide and located between and generally equidistantly from said two side walls, said scattering blade being electrically connected to said waveguide, being supported by the two side walls of said waveguide and extending from the free ends of said two wide side walls and outwardly therefrom, the short side walls of said waveguide terminating short of the free ends of said two side walls, said antenna also comprising a plate of electrically conductive material covering one half of said shaped aperture being disposed between said blade and one of said short side walls and being electrically connected to said waveguide.

9. In a microwave intrusion alarm system comprising at least one sensing unit, a main control unit, and a master alarm sounding device, the improvement wherein each sensing unit comprises a microwave antenna, a transceiver to which said antenna is coupled, a sensitivity control for adjusting the level of the output signal of said transceiver, a filtering amplifier connected to said sensitivity control for amplifying the output signal thereof, a level detector connected to the output of said filtering amplifier for blocking signals below a predetermined level, a local time delay circuit for blocking signals of short duration, and triggering means for generating an output signal of sufficient magnitude to trigger said master alarm sounding device when the output of said amplifier is of sufficient duration and magnitude, said microwave antenna comprising a rectangular waveguide whose free end is cut at an angle from each short side wall perpendicularly to the wide side walls for defining parallel outwardly extending pointed ends of each wide side wall, said antenna also comprising a scattering blade extending across the waveguide aperture between said pointed ends and parallel to said short side walls, said antenna also comprising an electrically conductive body extending between said blade and one of said short side walls and thus covering one-half of said shaped aperture.

* * * * *